United States Patent [19]
Cole, Jr. et al.

[11] Patent Number: 5,619,206
[45] Date of Patent: Apr. 8, 1997

[54] SECONDARY RADAR DIGITAL MONOPULSE RECEIVING APPARATUS AND METHOD

[75] Inventors: Elbert L. Cole, Jr., Catonsville; Richard A. Enstrom, Ellicott City; Terence E. Olver, Baltimore, all of Md.

[73] Assignee: Northrop Grumman Corp., Los Angeles, Calif.

[21] Appl. No.: 560,186

[22] Filed: Nov. 20, 1995

[51] Int. Cl.$^6$ .................................................. G01S 13/91
[52] U.S. Cl. .............................. 342/37; 342/80; 342/149; 342/152; 342/194
[58] Field of Search ................................ 342/37, 32, 80, 342/149, 152, 194, 197

[56] References Cited

U.S. PATENT DOCUMENTS

| | | | |
|---|---|---|---|
| 4,710,774 | 12/1987 | Gunny | 342/455 |
| 4,719,465 | 1/1988 | Kuroda | 342/151 |
| 5,182,563 | 1/1993 | Blinchikoff et al. | 342/32 |
| 5,196,855 | 3/1993 | Kuroda | 342/37 |
| 5,341,139 | 8/1994 | Billaud et al. | 342/40 |
| 5,374,932 | 12/1990 | Wyschogrod et al. | 342/36 |
| 5,528,244 | 6/1996 | Schwab | 342/37 |

*Primary Examiner*—John B. Sotomayor
*Attorney, Agent, or Firm*—Walter Sutcliff

[57] ABSTRACT

A secondary radar uses monopulse reception techniques to improve the estimate of the aircraft position and to improve the reliability of the reply decoding process. Digital signal processing techniques are utilized to replace the analog circuit used in the prior implementations. The secondary radar implements monopulse processing using a half angle phase method wherein the sum and difference signals are encoded in a complete phasor. The detection of the signal and extraction of the azimuth angle data is implemented using a digital receiver concept. The complex phasor is sampled at an intermediate frequency, down converted to baseband and detected. The azimuth angle is computed using arithmetic methods implemented by digital signal processing circuitry.

11 Claims, 5 Drawing Sheets

SECONDARY RADAR DIGITAL MONOPULSE RECEIVING APPARATUS AND METHOD

BACKGROUND OF THE INVENTION

1. Technical Field of the Invention

The present application is directed to the creation of a secondary radar digital monopulse receiver. The digital concept entails converting complex phasers made up of sum beams and difference beams received from a secondary surveillance radar (SSR) antennae to digital form and performing phase detection and log video detection processes using digital methods.

2. Description of Related Art

One of the principle sensors used to determine the presence and location of civilian aircrafts is SSR. The SSR is a beacon type of radar system employing active retransmission techniques on the aircraft. The ground portion of this system solicits both identification and altitude data from the aircraft. The aircraft responds to the request by transmitting either its identity or altitude data.

It is the ability to obtain three-dimensional location (slant range, azimuth, and altitude) and identification data that has made this radar so useful in air traffic control (ATC) systems. The greater reliance placed on this capability by civil ATC worldwide, has driven radar suppliers and developers to provide a significant number of improvements in the SSR. The most noteworthy, in the context of the present application, is the use of monopulse techniques to improve the azimuth accuracy of the sensor.

Current monopulse equipped SSR use an antennae equipped with types of azimuth patterns such as those depicted in FIG. 1a of the present application. A high gain, directional beam (sum pattern 1 as shown in FIG. 1a) is provided, over which RF energy is radiated to the aircraft. This pattern is also used to receive the aircraft response. The antennae is designed to provide two squinted receive only beams, labeled 3a and 3b in FIG. 1a, one existing on either side of the sum beam 1. These beams are used for reception only and are known as the difference beams.

The ratio of the amplitudes of the aircraft reply signals received in the difference beams 3a and 3b, to that of the sum beam 1, then produces a measure which is related to the angle off boresight (boresight is the null axis of the difference beams in the horizontal plane, wherein element 15 of FIG. 1a is the antennae boresight) of the aircraft transmitting the reply. As shown in FIG. 1 of the present application, the sum beam responses are used for extraction of reply codes transmitted by the aircraft transponder. It should be noted that the use of monopulse techniques have resulted in a dramatic four to one improvement in the accuracy of measurement of aircraft azimuth position.

As shown in FIG. 1, element 17 represents a target angle $\phi$. Theoretically, this target angle, also known as the angle off boresight (with boresight being element 15 for example) was calculated utilizing a ratio of the sum and difference amplitude to obtain the angle off boresight. The received signals were summed in a summing device 5; difference signals were generated in a difference device 7; and then by dividing the generated sum $\Sigma$ shown by 11 in FIG. 1a, by the difference ($\Delta$) in a dividing device 9, a ratio of the amplitudes of the difference ($\Delta$) and the sum ($\Sigma$) shown by element 13 of FIG. 1a was generated. Then, as shown in FIG. 1b, by plotting the generated ratio ($\Delta/\Sigma$) 13 versus a target angle $\phi$, a particular angle off boresight was derived.

In previous systems, the determination of the azimuth angle over the reply was accomplished by computing the ratio of the reply amplitude as measured by the difference (3a and 3b) and sum (1) beams. The determination of the monopulse amplitude ratio (difference/sum), to derive azimuth angle, was implemented by one of two competing methods. The first method used amplitude comparison (a non-coherent technique) to directly produce the desired end result at baseband:

$$\text{Azimuth angle } (\phi_m) = k [\text{Log (D)} - \text{Log (S)}] \quad (1)$$

wherein D was the difference pattern and S was the sum pattern. This first type of receiver never gained wide acceptance, however, due to the amplitude matching requirements needed for the D and S channels.

The second type of receiver combined the sum and difference signals into two vectors S+jD and S−jD, and then extracted the desired ratio of the difference and sum signals ($\Delta/\Sigma$) 13 as shown in FIG. 1a, with a phase comparator. The second type of receiver (phase monopulse processing) was the type implemented in the Mode S and Monopulse SSR (MSSR) radars. A conceptual block diagram of such a receiver is shown in FIG. 2a.

The Mode S receiver was a two-channel (alpha and beta) version of the phase monopulse processor discussed previously. The sum and difference amplitudes were combined by hybrid circuit 19 to form a first complex phasor s+jd 20 as shown in FIG. 2a, and through a second hybrid circuit 21, to form a second complex phasor −(d+js) 22 as shown in FIG. 2a. FIG. 2b illustrates a relationship between the two phasors 20 and 22. In the two complex phasors, the phase of the signal contains the relative amplitudes of the sum and difference signals (the sum signal designated by s and the difference signal designated by d).

The complex phasor 20 was then passed to another hybrid circuit 23 to derive the demodulation signal and simultaneously passed to a limiter 25a. Thus, the complex phasor 20, the partial phasor js shown by 24 in FIG. 2a, and phasor 22 were hard limited by limiters 25a, 25b, and 25c respectively. From limiter 25b, a hybrid circuit 27 was then connected, which produced outputs for input to a phase detector 29a and a phase detector 29b, the phase detector 29a also receiving an input from limiter 25a and the phase detector 29b also receiving an output from limiter 25c as shown in FIG. 2a. Phase detector 29a for the alpha channel, and phase detector 29b for the beta channel, then converted the vectors to baseband. Finally, using a summing device 33 connected to phase detector 29a and phase detector 29b, an output azimuth angle $\phi_m$ 35 was then generated.

These limiters 25a–c ensured that the output of the phase detectors 29a and 29b depended only on the relative phase, and not the amplitude of the two complex phasors. As such, less emphasis was needed for amplitude matching of each phase processing channel (alpha and beta) and the reference signal (−s or js).

FIG. 2a also illustrates two log detectors 31a and 31b, connected to the outputs of the hybrid circuit 23 for the alpha and beta channels respectively. The two log detectors produced Log (S) and Log (D) video (baseband) signals. The Log (S) signal, shown as Log sum video (As) 37 in FIG. 2a, was used to extract the digital data transmitted by the aircraft. The Log (D) signal, shown as Log difference video 39 (Ad) in FIG. 2a, was used for receive sidelobe suppression and beam sharpening purposes. The signal 35 was represented in terms of the Log sum video signal 37 and the Log difference video 39 as follows:

$$\phi_m = \pm 2 \tan^{-1}\left(\frac{Ad}{As}\right) \qquad (2)$$

Using logarithmic amplifiers or detectors such as 31a and 31b, and limiters such as 25a-c in the aforementioned Mode S design were extremely expensive. Further, they were prone to failure and drift, the drift problem being one that required recalibration of the receiver more often than desired. Thus, alternative methods of implementing the Mode S type of receiver, for example, were desired, with goals of reducing costs and improving maintainability of the receiver. Prior to the present application, no acceptable results were obtained.

SUMMARY OF THE INVENTION

One object of the present application is to solve the aforementioned problems and to implement a Mode S type of receiver, for example, of a reduced cost, with improved maintainability of the receiver.

A second object of the present invention is to solve the aforementioned problems by applying digital processing methods.

Another object of the present invention is to produce a secondary surveillance radar digital monopulse receiver using digital techniques.

Still another object of the present application is to utilize digital monopulse phase detection to determine phase imbedded in the S+jD, S−jD vectors using digital techniques.

Yet another object of the present application is to utilize video amplitude determination by extracting amplitudes of the sum and difference signals from monopulse complex vectors (S+jD), (S−jD) using digital techniques.

An even further object of the present application is to produce a receiver which eliminates limiters, log amplifiers, phase detectors, and video quantizers, resulting in lower cost, higher reliability, and reduced need for calibration.

A yet even further object of the present application is to produce a receiver including extra bits that can be used for adjustment of analog bias, drift, etc. and calibration purposes, such as for scaling and bias offset purposes.

A still further object of the present application is to eliminate troublesome analog components resulting in a design of a receiver that is easier to produce.

Further, another object of the present application is to greatly reduce extensive alignment and component matching needs in a receiver, thus contributing to the ease of production and testing of the receiver in a factory.

Further, still another object of the present application is to design a digital monopulse receiver which provides an azimuth measurement performance equal to or better than Mode S and MSSR analog systems.

These and other objects of the present application are fulfilled by providing a digital monopulse radar receiving apparatus, comprising:

first means for generating complex phasor components from radar sum (Σ) and difference (Δ) signals received by an antenna from an aircraft including, down conversion means for down converting the received sum and difference signals to a first relatively lower frequency, and analog to digital conversion (ADC) means for sampling the down converted sum and difference signals at the first relatively lower frequency to generate digital signals; and second means for determining an azimuth angle, indicating an angle of the detected aircraft in relation to a boresight of the antenna, from the digital signals including, demodulating means for demodulating the digital signals at a second frequency, relatively lower than the first relatively lower frequency, to generate complex inphase and quadrature components, and means for generating the azimuth angle from the generated complex inphase and quadrature components.

The objects of the present application are further fulfilled by providing a digital monopulse radar receiving method, comprising the steps of:

(a) down converting radar sum (Σ) and difference (Δ) signals received by an antenna from an aircraft to a first relatively lower frequency;

(b) sampling the down converted sum and difference signals at the first relatively lower frequency to generate digital signals representing complex phasor components of the received sum and difference signals;

(c) demodulating the digital signals at a second frequency, relatively lower than the first relatively lower frequency, to generate complex inphase and quadrature components; and (d) generating an azimuth angle, indicating an angle of the detected aircraft in relation to a boresight of the antenna, from the generated complex inphase and quadrature components.

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Initially, it should be noted that throughout the drawings of the present application, like numerals represent like components.

The basic aspect of the present application is to utilize digital processing methods to solve the problems previously discussed with regard to radar receivers. The digital processing entails converting S+jD and S−jD complex phasors to digital form and performing phase detecting and Log video detection processing using digital methods.

Figure 3:
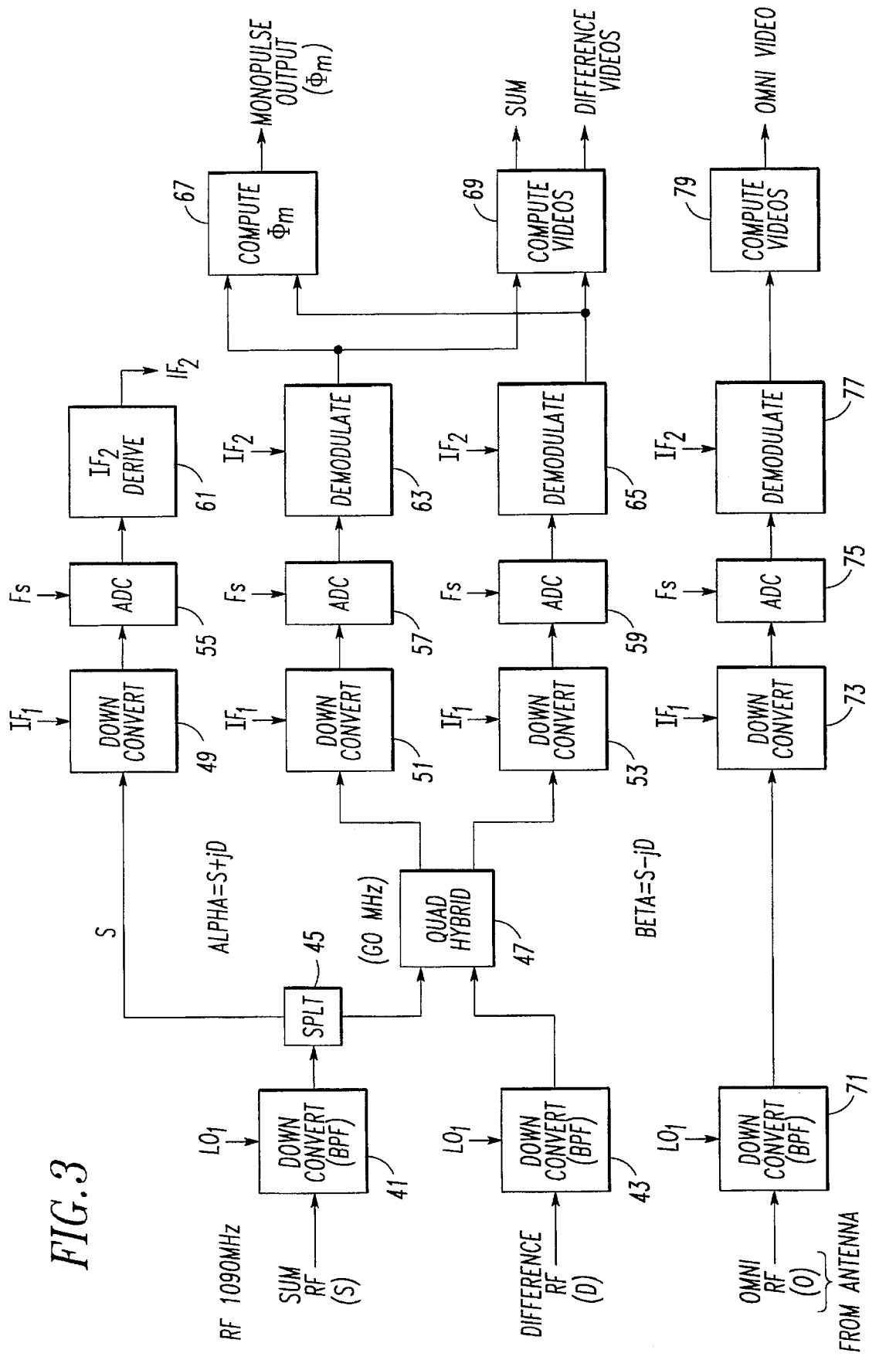
FIG. 3 illustrates a conceptual digital monopulse receiver of a preferred embodiment of the present application.

A conceptual solution and a conceptual aspect of the receiver of a preferred embodiment of the present application is shown in FIG. 3. The various interconnections of the elements shown in FIG. 3 will be explained as follows.

Initially, a sum signal (S) is input into a first down converter 41 which includes a bandpass filter (BPF). This down converter 41 further receives a first local oscillator frequency component $LO_1$ for down conversion. The difference signal (D) is input into a similar down converter 43 and BPF, input with the same local oscillator frequency component $LO_1$, as shown in FIG. 3. The output from element 41 is then input into a splitting device 45, with the first output of the splitting device being provided to a quad-hybrid circuit 47 and the second output of the splitting device being provided to a down converter 49, the down converter 49 also receiving an intermediate frequency signal $IF_1$.

Further provided to quad-hybrid circuit 47 is the output from down converter circuit 43. A first output from quad-hybrid circuit 47 is then input into another down converter circuit 51, input with the same intermediate frequency signal $IF_1$, this output being part of an alpha channel complex phasor S+jD.

A second output from quad-hybrid circuit 47 is input into a down converter circuit 53, similarly input with an intermediate frequency signal $IF_1$. This is part of the beta channel, involving complex phasor s-jD.

Connected to and receiving an output from down converter circuit 49 is an analog to digital converter (ADC) 55, which further receives an input sampling frequency signal $F_s$. Connected to and receiving the output of this ADC 55 is a derivation circuit 61 for deriving a second intermediate frequency signal $IF_2$ for subsequent use in demodulating the alpha and beta channels.

In the alpha channel, connected to and receiving an output from down converter circuit 51, is another ADC 57, which also receives an input sampling frequency signal $F_s$. Connected to and receiving the output of the ADC 57 is a demodulation circuit 63, the demodulation circuit further receiving the signal $IF_2$ previously generated.

In the beta channel, connected to and receiving an output of down converter circuit 53 is an third ADC 59, which also receives a sampling input frequency signal $F_s$. Connected to and receiving the output of this ADC 59 is another demodulation circuit 65, this demodulation circuit similarly receiving the second low frequency signal $IF_2$.

A circuit for computing the angle $\phi_m$ is shown as azimuth angle computation circuit 67, connected to and receiving the output of both demodulation circuit 63 and demodulation circuit 65. The output of azimuth angle computation circuit 67 then produces and outputs the monopulse angle off boresight ($\phi_m$).

Similarly, a video computation circuit 69 is connected to and receives the output of both demodulation circuit 63 and demodulation circuit 65. From this circuit, both sum and difference log video signals are calculated. These video signals will be explained later in more detail.

Figure 1A:
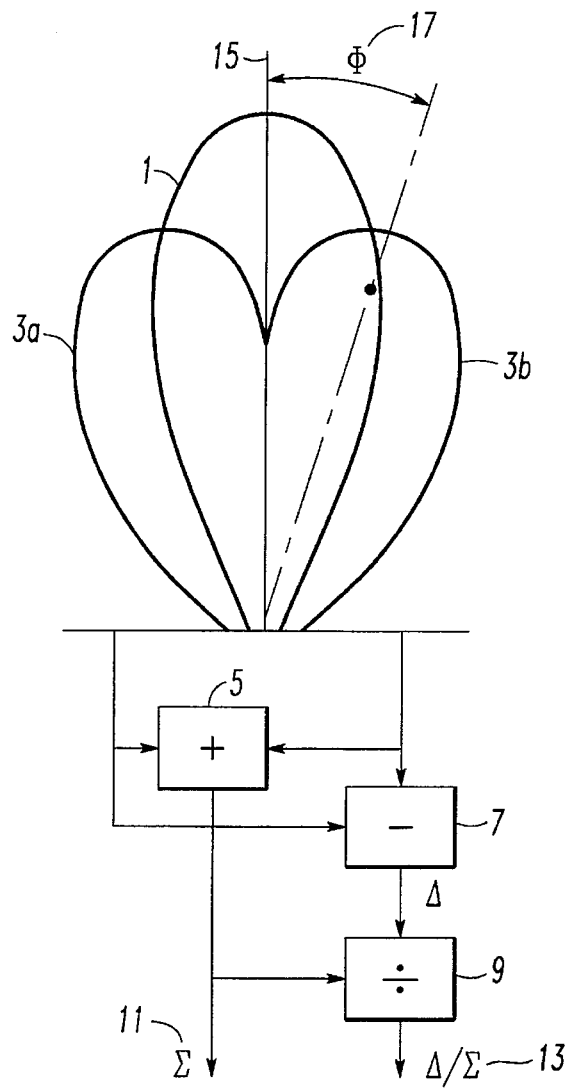
FIG. 1a illustrates a known antennae and theoretical circuitry for generating difference/sum ratio signals.
Figure 1B:
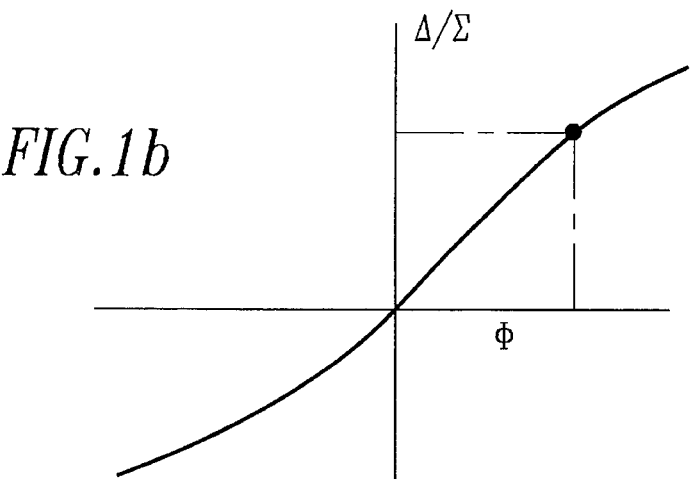
FIG. 1b illustrates a relationship between an angle off boresight and a generated difference/sum signal.

The secondary radar antenna utilizes three patterns, two of which (the sum and difference) have been discussed in conjunction with FIG. 1. The third pattern is an omni-directional pattern (as opposed to the directional patterns used for the sum and difference channels). The omni-directional characteristic permits the detection of replies that enter the receive channels via the sidelobes of the antenna sum pattern in particular. The signals derived via the omni channel (FIG. 4) are used for blanking the signals in the sum and difference paths. Essentially, it is a form of receive sidelobe blanking on reception.

The omni signal is obtained from the third receive port on the antenna and is processed in an analogous manner to the sum and difference signals. Since the use of the omni signal is for editing those replies received via the antenna sidelobes, preservation of its amplitude (and phase) relative to the other channels is not needed.

FIG. 3 further illustrates a circuit for calculating an omni video signal from an input omni RF signal (O). This omni RF signal is initially input into a down converter 71 which includes a bandpass filter, and which similarly receives an input low frequency signal $LO_1$. The output of down converter 71 is then input into a down converter 73, which also receives an input intermediate frequency signal $IF_1$. The output of down converter 73 is then input into an ADC 75, which also receives an input sampling frequency signal $F_s$. The output of ADC 75 is input into a demodulation circuit 77, which similarly receives second intermediate frequency signal $IF_2$. Finally, the output of the demodulation circuit 77 is input into a video computing circuit 79, which eventually produces an omni log video signal.

Regarding the operation of the system shown in FIG. 3, two complex phasors (S+jD and S-jD) are formed from the output of quad-hybrid circuit 47 and are synchronously down converted to a first low intermediate frequency $IF_1$, the phasor S+jD being down converted in the alpha channel by down converter 51 and the phasor S-jD being down converted in the beta channel using down converter 53. The phase relationship of the phasors is retained through the use of coherent sampling processes. This allows the extraction of the DS (difference/sum) amplitude ratio, shown as 13 of FIG. 1a.

The aforementioned down converted IF signals output from down converters 51 and 53 are then converted to digital form through ADCs 57 and 59 respectively. A digital processor, represented by demodulation circuits 63 and 65, then further down converts the signals, respectively, to baseband signals using a second intermediate frequency $IF_2$. Thereafter, the monopulse angle signal ($\phi_m$) is calculated through azimuth angle computation circuit 67, along with the sum and difference video signals through video computation circuit 69 respectively.

Figures 2A, 2B:
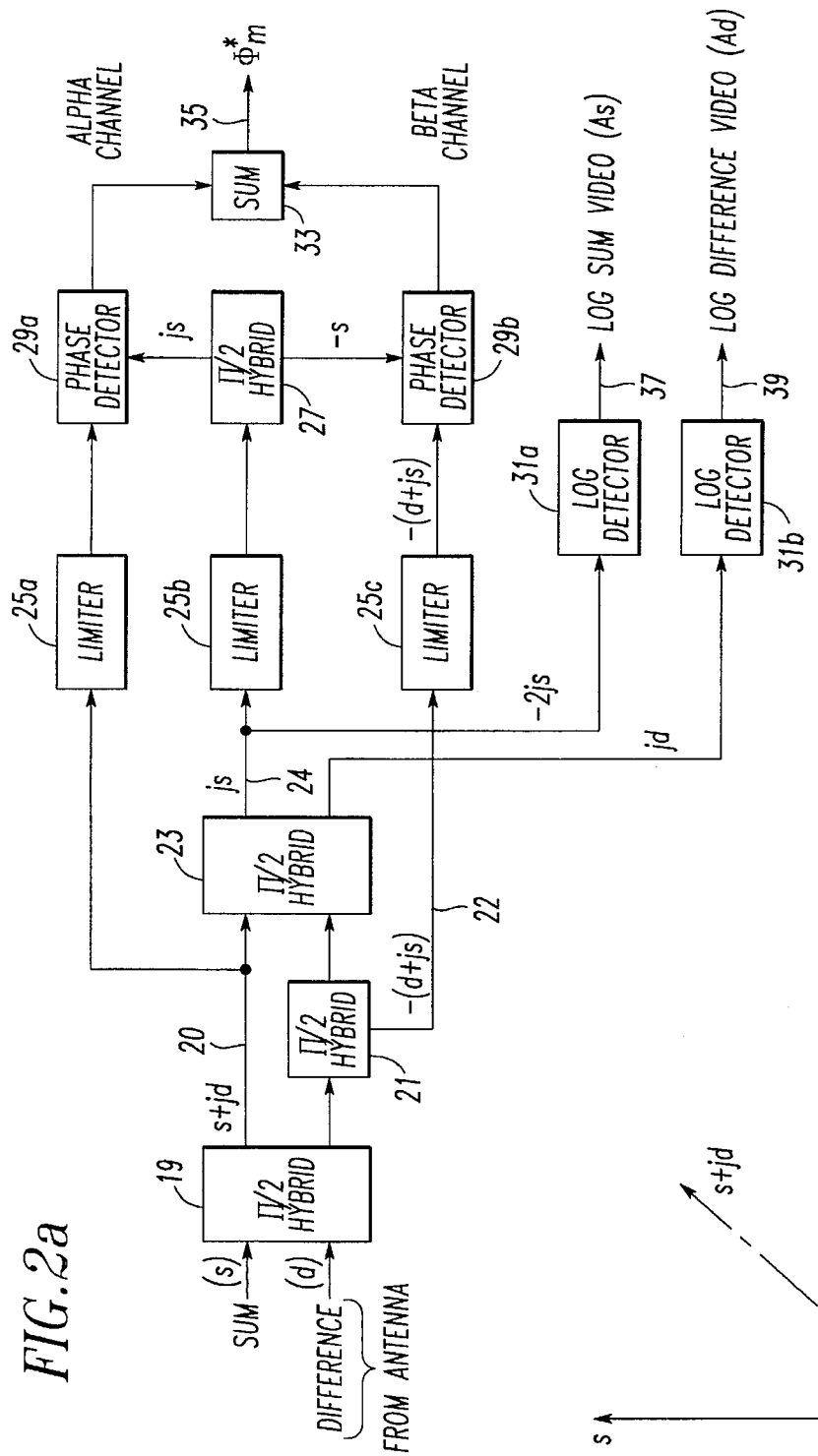
FIG. 2a illustrates a known Mode S receiver implementation (half angle processor) using limiter, log detector, and phase detector circuitry.
FIG. 2b illustrates a relationship between complex phase vectors.

Further, it should be noted that the sum signal (S) is also digitized (through down converter 49 and ADC 55) and is thereafter used to derive the second intermediate frequency ($IF_2$) through derivation circuit 61, this frequency being the frequency needed to demodulate the signals in the alpha and beta channel signals ($IF_2$ being input to demodulation circuits 63 and 65 in the alpha and beta channels, respectively). This approach eliminates the limiters, logarithmic amplifiers and phase detectors of the known receiver (FIG. 2), which were the sources of the problems discussed previously.

The choice to sample at a low intermediate frequency ($IF_1$) versus baseband was made to avoid complex (I and Q) sampling with ADCs. This eliminates the need for gain and phase matching of the resulting I and Q paths. The digital processor (encompassing demodulation circuits 63 and 65), at a derived second intermediate frequency $IF_2$, demodulates the signals following digital conversion from ADCs 57 and 59, respectively, and creates complex I,Q samples at baseband. The sum (S) and difference (D) video signals are computed by the following equations:

$$S = ((I_a + I_b)^2 + (Q_a + Q_b)^2)^{1/2} \tag{3}$$

$$D = ((I_a - I_b)^2 + (Q_a - Q_b)^2)^{1/2} \tag{4}$$

The monopulse phase angle signal ($\phi_m$) is calculated by the following equation:

$$\phi_m = \text{Tan}^{-1}(Q_a/I_a) - \text{Tan}^{-1}(Q_b/I_b) \tag{5}$$

where $I_a$ and $I_b$ are the inphase components of the alpha and beta channels and $Q_a$ and $Q_b$ are the quadrature components.

The processing concept is further extended to encompass the omni directional signals used for received sidelobe suppression. For this signal, the processing consists, as shown in FIG. 3, of only a synchronous detector, ADC and digital processing. This eliminates another log video detector.

The design of a digital version of the SSR monopulse receiver is fundamentally dependent upon the Mode S performance requirements for both the present beacon and Mode S modes of operation. There are five requirements which affect the digital receiver implementation:

1) Frequency of the aircraft transponder replies;
2) Shape of the reply pulses;
3) The dynamic range of the power received and processed by the sensor;
4) The range accuracy of the sensor; and
5) The azimuth angle accuracy of the sensor.

The frequency of the aircraft transponder replies are specified by the U.S. National Standard to be one 1090±3 MHz. The frequency of the radiated reply can vary transponder to transponder by as much as ±3 MHz. This creates a difficulty in digital receiver design in that the bandwidth needed is higher by 6 MHz than the actual bandwidth of the signal. The signal bandwidth is dictated by the need to preserve the reply pulse rise and fall times. The shape of the reply pulse has to be preserved through the receiver for range estimation and derivation of boresight angles. The pulse characteristics are:

1. Width—minimum width of 0.350 microseconds at the −6 dB points (half amplitude point, voltage); and
2. Rise time—rise time of 0.050 to 0.1 microsecond between the 10 and the 90% points of the pulse amplitude.

Pulses with this shape require a receive bandwidth of at least 2.1 MHz in order to reserve these pulse characteristics. This, in combination with the ±3 MHz reply frequency tolerance dictates a minimum operational receive bandwidth of 8.1 MHz.

The normal operation range for signals in the Mode S monopulse receiver is specified as −79 dBm to −20 dBm with a noise level of −95 dBm. Assuming that the least significant bit of the ADC is equal to the rms noise level, the dynamic range of the ADC must be at least −20−(−95)+3=78 dB, where the extra 3 dB is needed to avoid distortion of the peak signal level. This corresponds to N=14 bits for the ADC.

The range accuracy of the sensor is specified to be 25 ft., rms. In order to minimize the range sampling quantization error contribution to the range accuracy budget, a sampling rate of 16 MHz is used. This requires the sampling rates of the digital processor to be 16 MHz or greater.

An objective in the design of the digital monopulse receiver of the present application is to provide an azimuth measurement performance equal to or better than that of the Mode S and MSSR analog systems. Replacing the log amplifiers, limiters, and phase detectors of the analog implementation with the digital version eliminates that phase errors associated with these analog circuits, but also can introduce phase errors resulting from the signal quantization of the digital processes. A comparison of the two approaches in terms of monopulse phase measurement errors shows that 14 bit ADCs used with a digital phase detector having 8 bits (7 bits plus a sign bit) provides accuracies essentially equal to the Mode S monopulse performance. The analysis is outlined in the following paragraphs.

Quantization effects in the ADC affects the amplitudes of the in-phase and quadrature components Ia, Ib, Qa, Qb given in the expression for phase output (Equation (5)). The ADC quantization effects are a function of the signal amplitude and the amplitude of the noise voltage relative to the LSB (least significant bit) of the ADC. Since the quantization errors are a small percentage of the amplitude for large signals, the phase error due to ADC quantization is inversely proportional to the signal level. Consequently, the effects of ADC quantization are computed for the minimum signal for which the specified azimuth accuracy is required in Mode S, which is −69 dBm. The rms noise voltage is assumed to be equal to the ADC least significant bit. The noise power in the Mode S monopulse receiver is −95 dBm so that the minimum signal-to-noise ratio for the specified accuracy is S/N=−69−(−95)=26 dB. This signal is then used to compute quantized values for the I and Q components in equation (5), for a range of phases, and statistics are then collected on the resulting phases errors. RMS errors are calculated for difference-to-sum ratios of $A_d/A_s$=0,1,2, where 0 is on boresight, 1 is where the sum and difference signals are equal and 2 is at the extreme limit of the sum pattern. Table 1, provided hereinafter, is an example of resulting phase errors calculated based upon the aforementioned considerations.

TABLE 1

SUMMARY AND COMPARISON OF MONOPULSE PHASE MEASUREMENT ERRORS

| Difference to Sum Ratio (Ad/As) | ADC Quantization | RMS Phase Errors in Radians | | |
|---|---|---|---|---|
| | | Phase Detection | Digital System (Errors Added) | Analog System (Errors Estimated) |
| 0 | 0.014 | 0.008 | 0.016 | 0.015 |
| 1 | 0 | 0.008 | 0.008 | 0.020 |
| 2 | 0.023 | 0.008 | 0.024 | 0.023 |

The monopulse phase output ($\phi_m$) is derived from a look-up table wherein the inputs are I and Q outputs of demodulators 63 and 65 of FIG. 3, and the output is $\tan^{-1}$ (Q/I). The number of bits required in the table depends on the range of difference-to-sum ratios (Ad/As) required of the system. For a given monopulse channel, the phase output ($\phi_m$) is equal to $\tan^{-1}$ (Ad/As). The maximum required value of the ratio for the accuracy requirement is Ad/As=2. However, to provide for some performance margin, a value of Ad/As=3 is preferred, corresponding to a phase angle $\tan^{-1}(3)$=72.

If 7 bits are used to represent the maximum phase, the least significant bit (LSB) is 0.57° or 0.01 radians. The error in phase will be uniformly distributed over a quantization interval and the rms error will be $\alpha_{PH}$=LSB/$\sqrt{3}$=0.006 radians. Since the phase output of the receiver is the sum of the measured phases in two channels, the total phase error due to the phase detector quantization is $\alpha_{PQ}=\sqrt{2}\alpha_{PH}=0.008$ radians.

The phase errors due to the ADCs (as shown in Table 1) are then combined with the 0.008 radian phase detector error to yield the total phase error due to quantization. These errors, along with estimates of the phase errors caused by the analog circuits that were replaced by the digital processing, are also shown in Table 1. The entries in the two columns are nearly equal (assuming the analog method is tuned for maximum performance) and therefore result in essentially the same off-boresight angle error illustrating that the proposed digital implementation of the present application will not degrade azimuth accuracy relative to that of the Mode S system.

Figure 4:
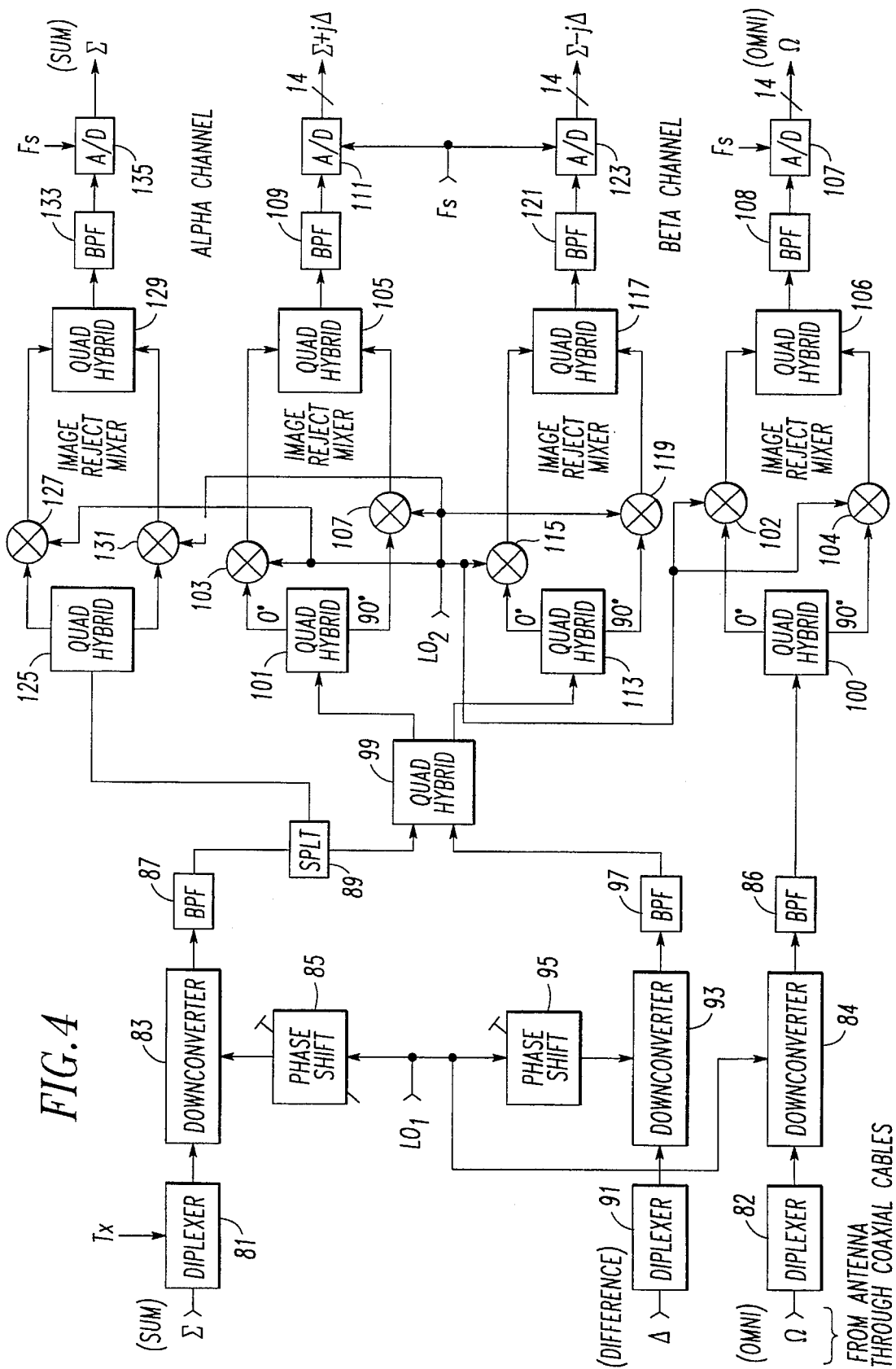
FIG. 4 illustrates analog receiver processing (half angle processor) of a receiver of a preferred embodiment of the present application.
Figure 5:
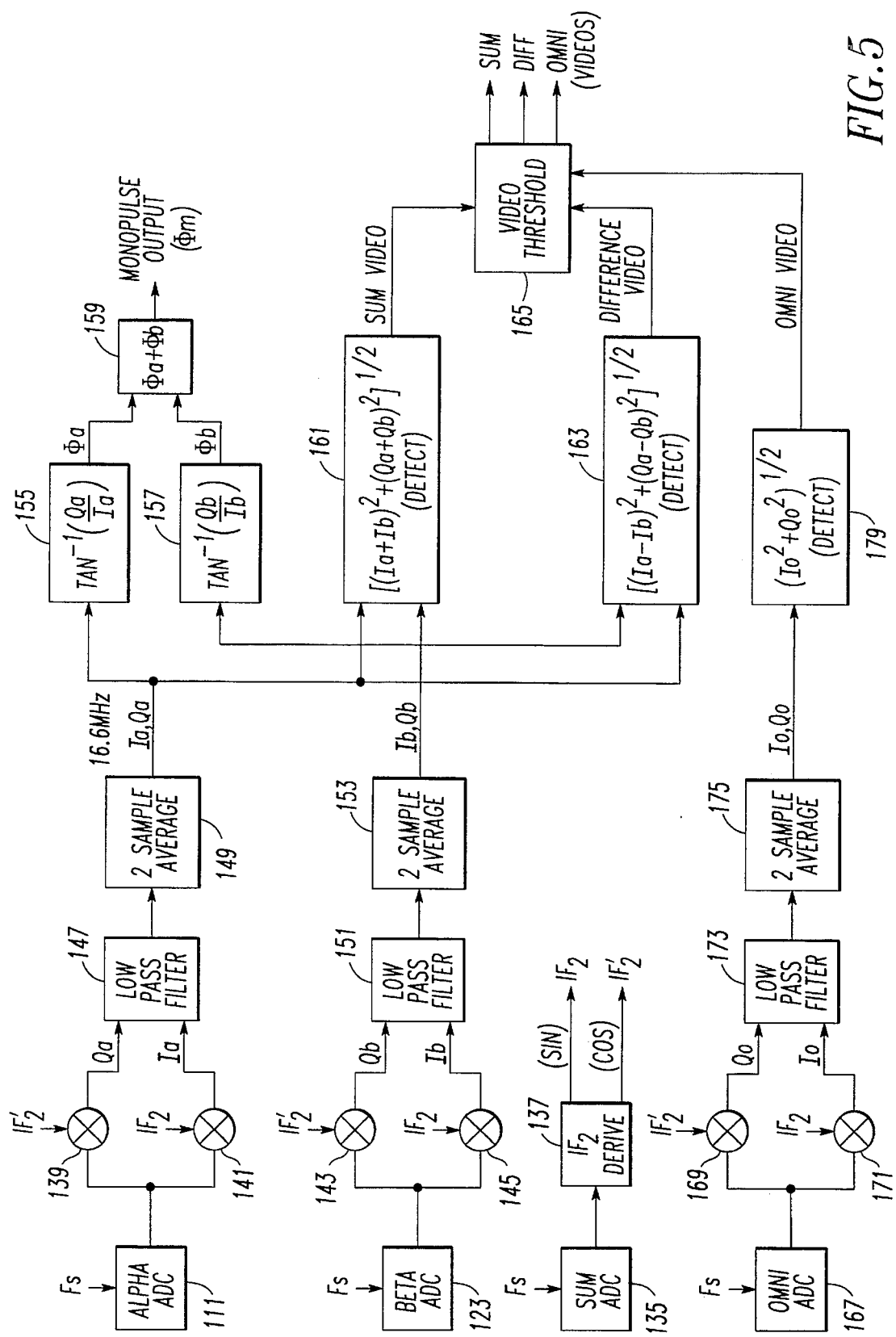
FIG. 5 illustrates digital receiver processing of a receiver of a preferred embodiment of the present application.

Implementation of the SSR digital monopulse receiver of a preferred embodiment of the present application is driven primarily by the sampling rates and dynamic range requirements identified previously. The intent of the disclosed design is to implement digital IF processing so that the phase detectors and limiters of FIG. 2 can be eliminated. The implementation description of a preferred embodiment of the present application will be discussed in two parts, a first analog processing portion as shown in FIG. 4 and a second digital processing portion as shown in FIG. 5 of the present application. A constraint on the approach of this exemplary implementation of an SSR digital monopulse receiver of the present application was imposed to minimize the changes to the hardware external to the receiver. As such, the approach interfaces the digital receiver to the current Mode S and Air Traffic Control Radar Beacon System (the present beacon system which Mode S replaces, abbreviated ATCRBS) reply processors in the same manner as does the existing analog receiver. This approach is reflected in FIG. 3 and should not be considered to be limitive of the present application.

Noting FIG. 4, there are a number of analog components remaining in the design (as well as amplifiers) that are not shown for the sake of simplicity. The analog components are subject to change (drift in gain and frequency) with temperature and age. Since the bulk of the analog components are split into two parallel channels (alpha and beta), taking the difference between the two when $\phi m$ is calculated eliminates some of the errors.

A more robust manner to keep the channels matched in amplitude and phase is to measure each and correct for the differences in two places. Amplitude differences (between alpha and beta) are measured with an automatic test signal applied at the receiver input. The values sampled at the ADC are then matched by scaling or referencing one path to the other. For example, a small change where alpha=1.1 beta can be removed by scaling either alpha or beta. This can be done at the ADC by adding or multiplying by a scaling factor.

Correcting for phase mismatches is done using the digital phase detector (computation circuits 155 and 157 and summation 159 of FIG. 5). Further, the test signal can be used to ascertain phase differences between alpha and beta and a scaling term can be developed to adjust $\phi a$ or $\phi b$.

The analog portion of the SSR digital monopulse receiver of a preferred embodiment of the present application is shown in FIG. 4 of the present application and essentially ends prior to conversion of signals from analog into digital form by ADCs 135, 111, and 123, circuits which are repeated for illustrative purposes in the digital processing portion (FIG. 5) along with omni ADC 167. The analog receiver portion, relative to FIG. 3 of the present application, begins with the received sum and difference signals S and D, respectively, and ends after the ADCs 55, 57 and 59 of FIG. 3. Normally, the ADCs are considered as a part of the receiver but need not be; the receiver is preferably ended at the ADC output for convenience of packaging.

The analog receiver portion of a preferred embodiment of the present application shown in FIG. 4 performs the down conversion, matched filtering, sum and difference combining, and eventually leads to the conversion to digital samples for the digital portion of the SSR digital monopulse receiver of a preferred embodiment of the present application. The circuitry of this analog receiver implementation portion will be initially discussed with regard to FIG. 4, with the operation and implementation and specifics to be discussed thereafter.

The secondary radar extracts a reply from an aircraft by radiating a series of pulses at 1030 MHz which form an interrogation. The aircraft, upon detecting the interrogation, radiates a series of pulses at 1090±3 MHz known as a reply. One difficulty exists in that the reply is not coherent with the interrogation; further, the reply also can vary over ±3 MHz centered around 1090 MHz. Coherent detection is not possible. Thus, the received signal is used to demodulate itself down to baseband in the proposed method. A basic discussion of the down conversion and demodulation process is as follows.

Referring to FIG. 4, the transmit signal (1030 MHz) is applied to the diplexers and routed to the antenna via a connected RF cable. The antenna receives the reply (1090±3 MHz) and sends it to the diplexer where it is routed to the down converter (for each of the sum, difference, and omni signals).

A series of frequency translations (down conversions) are performed to transform the signal to baseband as will be described hereafter. The baseband signal is a series of pulses having the width and rise time characteristics described previously. The down conversion process begins with the first down conversion (down converters 83 and 93 of FIG. 4) which translate the 1090±3 MHz reply to 60±3 MHz. $LO_1$ is a signal which can be +60 or −60 MHz with respect to 1090 MHz; for example it can be 1030 MHz. $LO_1$ is then mixed with the reply, resulting in a signal at 60±3 MHz which is applied to the BPF (elements 87 and 97 of FIG. 4). The phase shifter (95 of FIG. 4) in the $LO_1$ path is used to adjust for any differential phase shifts that may occur in the sum and difference receive paths. The range is typically 20–30 degrees.

The second down conversion occurs in the mixers (mixers 127, 131, 103, 107, 115 and 119 of FIG. 4). This translates the 60±3 MHz signal to the low IF frequency of 9.5±3 MHz. For this conversion, a second local oscillation frequency ($LO_2$) is used, having a frequency of 60−9.5 MHz or 50.5 MHz. The inphase and quadrature version of $LO_2$ is used to avoid creating frequency images which might distort the desired signal.

The desired reply has a 9.5±3 MHz modulation, the exact frequency varying over ±3 MHz from aircraft to aircraft, but is fixed for a given aircraft over the reply period (typically, 8 pulses). The 9.5±3 MHz range is low enough to permit conversion to digital form where the final down conversion will take place. Note, the exact frequency can vary from 6.5 to 12.5 MHz and is unknown for each aircraft.

Referring to FIG. 5, the sum signal is sampled and will be used to demodulate the S+jD and S−jD signals, all of which have the same modulation. A complex demodulation process is used to create the inphase (I) and the quadrature (Q) components of the sample. A complex demodulator requires the Cos ($\phi$) and Sin ($\phi$) versions of the demodulating frequency (phases of 0 degrees and 90 degrees). These are known as $IF_2$=Sin ($\phi$) and $IF_2'$=Cos ($\phi$). When $IF_2$ and $IF_2'$ are used in the mixing operation, the 9.5±3 MHz reply signals are converted to baseband (mixers 139, 141, 143, 145, 169 and 171).

In summary:

$LO_1 = 1030$ MHz $LO_2 = 50.5$ MHz $IF_2 = 9.5 \pm 3$ MHz

It should be noted that the exact values of $LO_1$ and $LO_2$ are shown for illustrative purposes only and other combinations are equally applicable. Next, a detailed discussion of the hardware involved will be given using FIGS. 4 and 5.

Initially, the received sum signal (S) is input into a diplexer 81, with the difference signal being into a diplexer 91, each diplexer further receiving the transmit signal. The diplexer is a device used to isolate the transmitted waveform from the received waveform. For the sum channel, the diplexer routes the transmitted signal to the antenna (to the diagram left) and receives aircraft reply over the same path. A local oscillator signal $LO_1$ is then generated (for example a signal of 60 MHz), phase shifted by phase shifter 85, and subsequently inputted into a down converter 83. The down converter 83 further receives the output signal of diplexer 81. From this down converter 83, an output signal is sent to a bandpass filter 87.

The low frequency signal $LO_1$ is also sent to a phase shifter 95 (operating similar to phase shifter 85), the output of which is sent to a down converter 93. The down converter 93 also receives the output signal of diplexer 91, and outputs a signal to a bandpass filter 97 (operating similar to bandpass filter 87).

The output signal of the bandpass filter 87 is input to a splitter 89 to equally split the received sum power to drive the alpha channel and the sum frequency estimation channel, and a first output signal from splitter 89 is input to a quad-hybrid circuit 99. The quad-hybrid circuit 99 further receives an output signal from the bandpass filter 97. The quad-hybrid circuit 99 (and a quad-hybrid circuit in general) combines the sum and difference channels to create the two vectors: sum+j difference and sum−j difference.

As previously stated, one output from splitter 89 is input into quad-hybrid circuit 99. Further, a second output signal from the splitter 89 is input to another quad-hybrid circuit 125. The quad-hybrid circuit 125, in combination with the mixers, forms an image rejection mixer to down convert the sum signal to the low intermediate frequency $IF_2$ and a version of the second intermediate frequency signal $IF_2'$ ($IF_2 = Am \sin(\omega_2 t)$ and $IF_2' = Am \cos(\omega_2 t)$) as will be discussed hereinafter.

Quad-hybrid circuits 125 and 129, mixers 127 and 131, and bandpass filter 133 of FIG. 4 perform a down conversion operation by mixing the sum signal (at 60 MHz) with $LO_2$ (50.5 MHz). The resulting signal is at 9.5±3 MHz, which is then further sampled by the ADC, The quad-hybrid circuits 125 and 129 and mixers 127 and 131 form a complex mixing operation that is amenable to rejecting the image frequencies that result from the mixers. Thus, they can be known as an image reject mixer (as can the three other similarly arranged mixers and quad-hybrid circuits shown in FIG. 4).

A first output signal from the quad-hybrid circuit 125 is input to a mixer 127. The mixer 127 also receives an input signal from a low frequency signal generated ($LO_2$), which can be a 50.5 MHz signal for example. A second output signal (phase shifted by 90 degrees) from the quad-hybrid circuit 125 is input to a mixer 131, a mixer which also receives the low frequency input signal $LO_2$ of 50.5 MHz for example. The output signals from both the mixer 127 and mixer 131 are each input to a quad-hybrid circuit 129. The output signal from this quad-hybrid circuit 129 is then input to a bandpass filter 133 (passing a band of 6.5–12.5 MHz). The output signal output from the bandpass filter 133 is then input to an ADC 135 for conversion to digital samples (which also receives an input sampling frequency signal $F_s$), and as shown in FIG. 5, and an output signal therefrom is thereafter input to a digital circuit 137 for deriving a second intermediate frequency signal ($IF_2$) and a phase shifted version of that signal $IF_2'$.

From the quad-hybrid circuit 99 of FIG. 4, the complex sum and difference vector ($\Sigma + j\Delta$ and $\Sigma - j\Delta$) signals at a frequency of 60±3 MHz are output to an alpha and beta channel, respectively. The terms $\Sigma + j\Delta$ and $\Sigma - j\Delta$ are formed by the quad-hybrid circuit, but are at the 60 MHz modulation. The following components up to the ADC merely translate the frequency of each to 9.5±3 MHz.

In the alpha channel, the 60 MHz $\Sigma + j\Delta$ signal is input to a quad-hybrid circuit 101. Output signals from this quad-hybrid circuit 101 are then input to mixers 103 and 107, respectively, each of these mixers also receiving an input of the aforementioned low frequency signal $LO_2$. Outputs of mixers 103 and 107 are then connected to a quad-hybrid circuit 105 and transmit output signals thereto. In the alpha channel, the output signal from the quad-hybrid circuit 105 is then input to a bandpass filter 109, and an output signal therefrom is thereafter output to an ADC 111 to convert $\Sigma + j\Delta$ to digital form.

The image reject mixers formed by elements (101, 103, 107, 105); elements (125, 127, 131, 129); and elements (113, 115, 119, 117) are used to down convert the signal frequencies from 60 MHz to 9.5 MHz. The image reject mixer is well known in the state-of-art and is the preferred implementation for wide band signals. It should be noted that the bandwidth of the signal is nearly 10 MHz. Thus, to avoid image frequencies, this type of mixer is needed.

In the beta channel, the components used (mixers, quad-hybrid circuits, image reject mixers, BPF, A/D, etc.) operate in a manner similar to that previously described regarding the alpha channel. Further, another output from quad-hybrid circuit 99, $\Sigma - j\Delta$ at 60 MHz, is input to a quad-hybrid circuit 113. Two outputs of the quad-hybrid circuit 113 are then input to each of mixers 115 and 119, respectively, each of these mixers further receiving the same low frequency signal $LO_2$ 50.5 MHz input. Outputs of the mixers 115 and 119 are then input to a quad-hybrid circuit 117. The output of the quad-hybrid circuit 117 is received by another bandpass filter 121. The output of the bandpass filter 121 is then connected to an ADC 123, to convert the signal $\Sigma - j\Delta$ to digital form. A further description of the operation of the circuit shown in FIG. 4 will be discussed as follows.

As previously discussed, the details of the analog receiver implementation portion of the present application are shown in FIG. 4 of the present application. The circuit shown in FIG. 4 features a first low $IF_1$ (using $LO_1$ of 1030 MHz), where down conversion of the signals to a 60 MHz frequency and bandpass filtering is accomplished. The complex monopulse phasors ($\Sigma + j\Delta$, $\Sigma - j\Delta$) are created at 60 MHz with quad-hybrid circuits in parallel alpha and beta channels. Following the quad-hybrid circuits 105 and 117, and down conversion to 9.5 MHz, the signals are output through ADCs 111 and 123 in the alpha and beta channels are the complex phasors in digital form: alpha channel=$\Sigma + j\Delta$; and beta channel=$\Sigma - j\Delta$.

The aforementioned complex phasors $\Sigma + j\Delta$ and $\Sigma - j\Delta$ are processed in two parallel channels designated as the alpha and beta channels of FIG. 4 for example. This two channel approach permits reduction of errors introduced by analog circuitry after the quad-hybrid circuits. The alpha and beta channel signals are mixed down, through mixers 103 and 107 (alpha channel) and through mixers 115 and 119 (beta channel) to a second low IF frequency $IF_2$ using $LO_2$ (of 50.5 MHz for example), filtered (through BPF 109 and 121 to yield the signals at 9.5±3 MHz, respectively) and converted to digital samples (through ADC 111 and ADC 123). The ADCs 111 and 123 create the equivalent of 14 bits of amplitude dynamic range at a sampling rate of 33.2 MHz.

A major factor in the design of the receiver is the frequency at which the signal is to be sampled by the ADC. The simplest approach is to sample at the first IF frequency of 60 MHz with 14 bits of resolution in the ADC. Such ideal sampling should be included within the context of the present application. However, at the present time, there are no ADCs available that will sample at a 60 MHz rate with 14 bits of resolution. Further, known available ADCs that will operate at 60 MHz, at the present time, have poor signal to noise ratios.

Selection of a lower frequency signal band ($IF_2$) is complicated by the frequency tolerance of the replies, ±3 MHz, requiring an operational bandwidth of 10 MHz when the pulse rise times are also considered. Presently available ADCs permit either over or under sampling of the 10 MHz band. Thus, the choice of the second IF frequency ($IF_2$) is dependent on the intermodulation products generated internally in the ADC that are aliased into the desired band. This problem can be mitigated by the use of high sampling rates. Three (3) exemplary of IF implementation from that presently available involve:

(1) Complex I and Q sampling over a band of DC to 5 MHz. Using an over sampling frequency of 16.6 MHz yields an increase of 3 dB in signal to noise ratio. Higher sampling rates will yield even greater improvement, although the ±3 MHz tolerance of the reply frequency will be a problem;

(2) Using a low IF band such as 4.5 to 14 MHz. A sampling frequency of 33.2 MHz will yield a 6 dB improvement in signal to noise ratio; and (3) Using a high IF band of 20 to 30 MHz. A sampling frequency of 16.6 MHz will yield an improvement of 3 dB in signal to noise ratio.

It should further be noted that intermodulation products within the desired band will occur with all three (1–3) of the aforementioned choices.

Presently, no single ADC is available that provides the necessary sampling rate and dynamic range (16.6 MHz at 78 dB). This should not be considered limitive of the present application since, if one were available, it should be clear that one could be used. Further, two 10 bit ADCs with a 30 dB overlapping range provide a workable solution.

For example, a first ADC with a range of 0 to 51 dB and a second ADC with a range of 27 to 78 dB can be used to provide the necessary sampling rate and dynamic range. In conjunction with such, a voltage selection circuit is initially used to determine the voltage of the input signal and to apply the signal to one of the aforementioned first and second ADC circuits. The signal is then processed when output from the appropriate ADC, and thus the two 10 bit ADCs can be used to produce a 14 bit output within the appropriate dynamic range. Analog devices presently available include the AD 9060, a 10 bit flash converter with good signal to noise performance which can be sampled at 75 MHz. Ahead of the converter, a sampling amplifier is needed. Further, the AD 9101 will operate up to 125 MHz. Used together, the aforementioned analog to digital (ADC) converters provide sufficient resolution to achieve the required monopulse accuracy and dynamic range requirements.

The components described above are merely an exemplary aspect of circuits which can be used to achieve the desired functions of the present application. The aforementioned components are economically priced and will reduce the cost of the receiver, as well as improve its performance. The choice of the final approach from the three choices listed previously for IF implementation can be experimentally determined when the properties of the ADC components are known. Presently, the approach using a low IF frequency (choice (2)) is preferred and is described as a baseline approach (a low IF band of 9.5±3 MHz was chosen using a sampling frequency of 33.2 MHz due to the availability of existing ADCs).

Referring to FIG. 4, the omni signal is input to the diplexer 82, the omni signal being received from the antenna through coaxial cables. The diplexer 82 similarly also receives the transmit signal. It should be noted that the diplexer 82, as well as the remaining components (i.e. the down converter, BPF, quad-hybrid circuits, mixers, and ADC) operate in a manner similar to like components previously described with regard to the processing of the sum signal, including processing in the alpha and beta channels.

Connected to the diplexer 82 is a down converter 84. The down converter 84 receives the output of the diplexer 82. A local oscillator signal $LO_1$ is generated (for example a signal of 60 MHz), and is subsequently input into the down converter 84. From this down converter 84, an output signal is sent to a bandpass filter 86. The bandpass filter 86 is then connected to a quad-hybrid circuit 100.

Two signals from the quad-hybrid circuit 100 are output to mixers 102 and 104 respectively, each of these mixers also receiving an input of the low frequency signal $LO_2$. Outputs of mixers 102 and 104 are then connected to a quad-hybrid circuit 106 and output signals of mixers 102 and 104 are transmitted to the quad-hybrid circuit 106. The output of the quad-hybrid circuit 106 is then connected to another bandpass filter 108 which receives an output signal from the quad-hybrid circuit 106. An output signal from the bandpass filter 108 is then input into the ADC 167 as previously described.

The digital processing portion of the monopulse receiver of the present application will be discussed with regard to FIG. 5 of the present application. Initially, the interrelated circuitry of FIG. 5 will be discussed, with the operation thereof to be discussed thereafter. The circuitry shown in FIG. 5 of this digital processing portion of the monopulse receiver of the present application is as follows.

As previously discussed, ADCs 111 and 123 produce the 14 bits complex vectors $\Sigma+j\Delta$ and $\Sigma-j\Delta$ having a frequency of 9.5±3 MHz, respectively. The sum signal ($\Sigma$) is output from ADC 135. Further, the omni signal is output from ADC 167. Finally, it should be noted that each of ADCs 111, 123, 135, and 167 receive an input sampling frequency signal (Fs), of a value as discussed previously.

As previously discussed, the sum signal output from ADC 135 is input into a digital circuit 137 used to derive a second intermediate frequency signal $IF_2$ ($IF_2$=Am Sin ($\omega_2 t$)) and a quadrative version $IF_2'$ ($IF_2'$=Am Cos ($\omega_2 t$)). Output from digital circuit 137 is the second intermediate frequency signal $IF_2$, and a phase shifted version of the intermediate frequency signal $IF_2'$. The following is a discussion of the derivation of $IF_2$ and $IF_2'$.

The reply signal is generated in the aircraft at 1090 MHz, in response to an interrogation by the secondary radar. The reply signal reception and processing is the subject of the present application. The aircraft generates the reply (consisting of a series of pulses modulated by the 1090 MHz carrier) non-coherently; the aircraft transponder is permitted to allow the carrier to vary ±3 MHz about 1090 MHz.

The variation of the carrier frequency (±3 MHz) generated by the aircraft precludes the use of fixed demodulation frequencies in the receiving radar. So, the received carrier is extracted and used for the down conversion to baseband. This is the extracted sum signal which, after two down conversions, is sampled by an ADC (resulting in $IF_2$).

The final down conversion stage depicted in FIG. 5 begins with the mixing of the alpha and beta channels with a reference (the sum channel signal and its quadrature). Referring to FIG. 5:

| | | |
|---|---|---|
| $I$ alpha | = alpha | * $IF_2$ |
| | = (sum + $j$ diff) | * As $\cos(\omega_2 t + \phi s)$ |
| $Q$ alpha | = alpha | * $IF_2'$ |
| $Q$ alpha | = (sum + $j$ diff) | * As $\sin(\omega_2 t + \phi s)$ | where:

As $\cos(\omega_2 t + \phi s)$ is the extracted sum signal and

As $\sin(\omega_2 t + \phi s)$ is the sum signal with a 90 degree phase shift.

Several methods are possible for obtaining the $IF_2$ demodulating frequency. The $IF_2$ signal has to be extracted from the reply due to the ±3 MHz of variation about the RF carrier. Thus, the methods examined then derive $IF_2$ from the received reply. The usable methods include a first method (a) Vector Extraction, wherein the alpha and beta paths are used directly. Thus, alpha=sum+j difference and beta=sum-j difference. Further, upon manipulation, sum=½ (alpha+beta) and j difference=½ (alpha-beta).

As shown in FIG. 4, the frequency and phase content of the sum and difference signals are identical upon reception. They are received by different antenna patterns but result from the same source, the aircraft. By letting sum=As $\cos(\omega_0 t+\phi s)$ and difference=Ad $\cos(\omega_0 t+\phi d)$, and rotating the difference signal by 90 degrees, this results in difference=Ad $\cos(\omega_0 t+\phi d+\Pi/2)$ and difference=-Ad $\sin(\omega_0 t+\phi d)$. Then the sum and j difference signals are in quadrature and in the form desired for the last down conversion.

This method (a) can be used but has a few drawbacks. For example, the amplitudes Ad and As vary as a function of the antenna patterns, so normalization must take place. Further, the value of Ad at boresight can get very small. The $\phi s$ and $\phi d$ terms can differ as well, due to hardware differences in the two channels. This technique requires tight control of the phase difference between the two channels; which is an undesired complication.

A second method is (b) Direct Frequency Measurement. Sufficient samples per pulse are provided with the design to permit measurement (or estimation) of the sum signal. A reply pulse is typically 0.4 microseconds wide with the complete reply containing an average of eight replies. The preferred form of implementation consists of a zero crossing detector (determining the points at which the modulating signal changes polarity). For example, using sum=Ad $\cos(\omega t+\phi s)$ with arbitrary starting phase, the sampled signal has on the order of 4 to 8 zero crossings, with the digital circuitry using interpolation techniques to locate each zero crossing. An average of the 4 to 8 crossings is used to reduce the effects of noise. A table storing $\cos(\phi)$ then is used to reconstruct $IF_2$, $IF_2 = 1 \cdot \cos(\omega_m t)$ and its conjugate, $IF_2' = 1 \cdot \sin(\omega_m t)$ at the measured phase intervals ($\omega_m t$).

A third method is (c) Frequency Domain Measurement. An FFt or similar frequency domain technique can be used to estimate the frequency of the sum signal. Each reply pulse has 11 samples. For eight pulses, 88 samples across the reply can be used in a 128 point FFt, where 40 samples are zero filled. This technique requires the entire reply to be stored awaiting the outcome of the frequency estimator. This is not impossible, but it is somewhat costly. The technique (c) is not desired for this reason.

The preferred method is method (b). This method (b) allows the frequency to be estimated and requires the storage of a single pulse (0.4 μs). Thus, circuit 137 represents a circuit preferably executing method (b) above. This, however, should not be considered limitive since circuit 137 could also use methods (a) and (c) for example, to derive $IF_2$ and $IF_2'$.

In the alpha channel, the output of ADC 111 is input into two mixers 139 and 141. Also input into mixer 139 is the phase shifted version of the second intermediate frequency signal $IF_2'$ (Am $\cos(\omega_2 t)$), and input into mixer 141 is the second intermediate frequency signal $IF_2$ (Am $\sin(\omega_2 t)$).

The signals $\Sigma+j\Delta$ and $\Sigma-j\Delta$ are complex phasors. The digital representation of the signals is in the form of two signals: the real and the imaginary parts, known as I (the real) and Q (the imaginary). Thus, $(\Sigma+j\Delta)_{complex}=I+jQ$. Multiplying $(\Sigma+j\Delta)_{complex}$ by Am $\sin \omega_2 t$ and by Am $\cos \omega_2 t$ results in the desired I+jQ vectors.

By mixing at the frequencies $IF_2'$ and $IF_2$, complex digital samples Ia and Qa can be generated. Specifically, the samples Qa are output from mixer 139 and then input to a low pass filter 147. The samples Ia are output from mixer 141, and also input into lowpass filter 147. Thereafter, the Ia and Qa samples output from lowpass filter 147 are averaged over two sample intervals in two sample average circuit 149 to reduce the sampling rate to 16.6 MHz.

Multiplying the $(\Sigma+j\Delta)$ signal by Am $\cos(\omega_2 t)$ and Am $\sin \omega_2 t$ translates $(\Sigma+j\Delta)$ down to baseband. Shown are the digital equivalents of the image reject mixers noted in FIG. 4. The low pass filter removes the upper frequency components to yield the baseband signal. Since the pulse rise time is of importance, the signal bandwidth remaining is on the order of 5 to 6 MHz. Thus, it is necessary to have the sample rate in the range of 10-12 MHz to avoid aliasing. The 33.2 MHz sample rate of the data can be reduced subject to the 10-12 MHz restriction. Therefore, a two sample average reduces the amount of data to be processed without compromising the signal bandwidth.

Similarly, outputs from ADC 123 in the beta channel are input into two mixers 143 and 145. The modified version of the second intermediate frequency signal $IF_2'$ is also input into mixer 143, and the second intermediate frequency signal $IF_2$ is also input into the mixer 145. By mixing at the frequencies $IF_2'$ and $IF_2$, complex digital samples Ib and Qb can be generated. Specifically, output from mixer 143 are first complex samples Qb, and output from mixer 145 are second complex samples Ib. The aforementioned complex samples Qb and Ib are input to another lowpass filter 151, and are subsequently averaged over two sample intervals in two sample average circuit 153 to reduce the sample rate to 16.6 MHz. This occurs in a manner similar to that previously described regarding the alpha channel.

From two sample average circuit 149, the outputs (alpha channel complex samples Qa and Ia) are input to each of a computational circuit 155 used to compute an alpha channel version of the monopulse signal ($\phi_a$), and to detector circuits 161 and 163, used to compute sum video and difference video signals. Similarly, outputs (beta channel complex samples Qb and Ib) from two sample average circuit 153 are input to each of a computational circuit 157 used to compute the beta-channel version of the monopulse signal ($\phi_b$), and to detector circuits 161 and 163 used to calculate the sum video and difference video signals.

Output from computational circuit 155, the alpha channel version of the monopulse output signal $\phi_a$ is input to a summation circuit 159, along with the beta channel version ($\phi_b$) output from computational circuit 157. Thereafter, from summation circuit 159, a monopulse output signal ($\phi_m$) is generated.

Further, from detector circuit 161, a sum video signal is output and input into a video threshold circuit 165. Also, output from detector circuit 163, a difference video signal is input into the video threshold circuit 165. From this video threshold circuit 165, a final sum signal and difference signal are each output. The following is a more detailed description of the aforementioned components.

Computational circuits 155 and 157 are lookup tables which store $\phi_{a+b} = \text{Tan}^{-1}(a/b)$ (for example, a 4096 word table storing $\phi$ in 90/4096=0.022 degree increments). The full 360 degrees is determined by the sign of I and Q. The ratio of Q/I is also determined by a lookup table or can simply be computed. The alpha and beta values are summed (arithmetically) to average out any phase errors introduced in the processing.

The video signals (sum, difference and omni) are computed using detector circuits 161, 163 and 179 to add and multiply. The square root is taken using a lookup table which stores the $\sqrt{s}$ and $\sqrt{d}$. The circuits perform a square law amplitude detection function.

The output video is a series of pulses in time representing the reply data bits having the pulse width and rise time characteristics noted previously. The actual video is a series of digital words spaced at $\frac{1}{16}$ MHz intervals. The amplitude of the pulse is represented by the magnitude of the digital word. Finally, the threshold in video threshold circuit 165 is used to create a binary video stream (single line) where a 1 indicates that the pulse is above the threshold and a 0 indicates the converse.

Further, outputs from ADC 167 are input into mixers 169 and 171, respectively. Also input to mixer 169 is a modified version of the second intermediate frequency signal (IF$_2$'), and input into mixer 171 is the second intermediate frequency signal (IF$_2$).

The outputs from mixers 169 (complex samples Qo) and 171 (complex samples Io) are then input to a lowpass filter 173. The Io and Qo samples output from lowpass filter 173 are then input into two sample average circuit 175, which averages them over two sample intervals to reduce the sampling rate to 16.6 MHz. The outputs from two sample average circuit 175 are then input into detector circuit 179, to produce an omni video signal. The omni video signal is then input into video threshold circuit 165. Finally, an omni signal is output from video threshold circuit 165. This also occurs in a manner similar to that described regarding the alpha channel. Operation and a more detailed description of the aforementioned circuits discussed in FIG. 5 will be explained as follows.

The digital processing portion of the monopulse receiver of the present application receives alpha, beta and omni data in digital form from ADCs 111, 123 and 167, respectively. The ADCs provide video samples for each data path at 33.2 MHz; the signals being at a low IF of 9.5±3 MHz. The digital processing portion then down converts the data for each path to baseband, derives a monopulse azimuth angle ($\phi_m$) and generates Sum, Difference, and Omni videos for the reply processors.

As previously discussed, in the implementation of the digital processing portion of the monopulse receiver of the present application as disclosed in FIG. 5, the processor first demodulates the three video paths. A complex demodulation scheme is shown in FIG. 5. The complex samples (I and Q) are generated for each video path at 33.2 MHz by mixing the sum signal derived frequency (IF$_2$, and a quadrature version IF$_2$' derived in circuit 137 from the output of ADC 135) with the videos. IF$_2$ is the sum frequency at IF$_2$~9.5 MHz and IF$_2$' is IF$_2$ phase rotated by 90°. The I and Q samples are averaged over two sample intervals to reduce the sample rate to 16.6 MHz (in circuits 149, 153 and 175 for example). At this point, the complex samples for the alpha and beta channels consist of the following form:

$$I_a = 0.25(A_s A_m A_b)\text{Cos}(\phi_b - \phi_s + \phi_m) + 0.25(A_d A_m A_b)\text{Sin}(\phi_b - \phi_d + \phi_m) \quad (6)$$

$$Q_a = -0.25(A_s A_m A_b)\text{Sin}(\phi_b - \phi_s + \phi_m) + 0.25(A_d A_m A_b)\text{Cos}(\phi_b - \phi_d + \phi_m) \quad (7)$$

$$I_b = 0.25(A_s A_m A_b)\text{Cos}(\phi_b - \phi_s + \phi_m) - 0.25(A_d A_m A_b)\text{Sin}(\phi_b - \phi_d + \phi_m) \quad (8)$$

$$Q_b = -0.25(A_s A_m A_b)\text{Sin}(\phi_b - \phi_s + \phi_m) - 0.25(A_d A_m A_b)\text{Cos}(\phi_b - \phi_d + \phi_m) \quad (9)$$

wherein, $A_m$=LO$_1$ signal amplitude (FIG. 4)

$\phi_m$=LO$_1$ (element 85, FIG. 4)

$A_b$=first IF signal (LO$_2$) amplitude (FIG. 4)

$\phi_b$=first IF mixer phase (element 129 output, FIG. 4)

$A_s$=Received sum amplitude (input to element 81, FIG. 4)

$\phi_s$=Received sum phase (input to element 81, FIG. 4)

$A_d$=Received difference amplitude (input to element 91, FIG. 4)

$\phi_d$=Received difference phase (input to element 91, FIG. 4)

From these signals, the derived monopulse output ($\phi_m$) and sum and difference video signals as shown in FIG. 5 are determined.

The desired form of the monopulse angle ($\phi_m$) is in the form of a phase relation:

$$\phi_m = \pm 2 \text{ Tan}^{-1}(A_d/A_s) \quad (10)$$

The reply signal frequency tolerance of ±3 MHz does not permit using a receiver derived IF frequency to mix the signals down to baseband. However, to provide a bandpass characteristic in the range of 0 to 6 MHz, signals are mixed down to 9.5±3 MHz by the analog portions of the receiver noted in FIG. 4. The resulting signals still have the 3 MHz components and must be eliminated in the final down conversion to baseband.

The preferred form of implementation is to use a sample of the Sum signal to demodulate the alpha channel, beta channel, and omni channel signals as shown in FIG. 5. Eleven samples are available each pulse time to derive the demodulating frequency. The alpha channel, beta channel and omni paths will have to be stored for this interval to permit extracting IF$_2$. The Sum signal contains the transponder offset frequency (range of ±3 MHz) and is used directly to allow the desired conversion to baseband. The I and Q samples in the alpha and beta channels are individually used to compute the monopulse output by the equation:

$$\phi_m = \text{Tan}^{-1}(Q_a/I_a) - \text{Tan}^{-1}(Q_b/I_b) \quad (11)$$

As noted, the alpha and beta channels provide duplicate data. However, by combining the individual paths, a 2:1 reduction in the error statistics is provided. More importantly, the unknown phases $\phi_b$ and $\phi_s$ and $\phi_m$ are eliminated from the phase estimate by taking the difference between the alpha and beta signals.

The sum and difference videos are generated as shown in FIG. 5 using complex signals. The videos are generated at a 16.6 MHz rate in circuits 161 and 163 respectively:

$$\text{Sum} = ((I_a + I_b)^2 + (Q_a + Q_b)^2)^{1/2} \qquad (12)$$

$$\text{Difference} = ((I_a - I_b)^2 + (Q_a - Q_b)^2)^{1/2} \qquad (13)$$

Methods used to approximate the square root operation can be used.

Equations (12) and (13) can be computed directly by a stored program computer, such as a personal computer (PC). However, due to the sampling rate, the PC would not be able to provide the computations in real time. Instead, the implementation preferably uses digital arithmetic circuits (such as adders, multipliers, etc.) to provide the desired computations. The square root operation is approximated using numerical methods such as:

$$(Ia + Ib)^{\frac{1}{2}} = y = \max \begin{cases} |Ia| \\ \frac{7}{8}|Ia| + \frac{1}{2}|Ib| \\ \frac{1}{2}|Ia| + \frac{7}{8}|Ib| \\ |Ib| \end{cases}$$

Alternately, a lookup table storing $y = (I^2 + Q^2)^{1/2}$ can be used where the table is accessed using $(I^2 + Q^2)$ as the address.

The omni channel is processed, as explained using circuits 167, 169, 171, 173, 175 and 179, in a similar fashion to the alpha and beta channels, except that the monopulse phase is not calculated.

Each of the videos (Sum, Difference and Omni) is subjected to amplitude thresholding via video threshold circuit 165, which includes a fixed threshold, an STC threshold and an adaptive threshold. Typically, the threshold would be set for an SNR of 14–15 dB. The threshold operations also include comparison of the omni amplitude to the Sum for receive sidelobe suppression and beam sharpening. The threshold output is a binary stream of pulses for the reply decoders. The amplitude data is made available on a port to permit recording for off line analysis and antenna pattern plotting.

By the receiver and method of the present application, troublesome elements in the known receiver (referring to FIG. 2a) consisting of the limiters, phase detectors and log detectors are eliminated. The inherent stability of digital circuitry is instead used to replace them.

Further, an automatic apparatus is provided to correct for the drift, etc. of the remaining circuits. Also, the automatic alignment methods of the present application allow for the use of cheaper, less stable components in the analog receiver, since automated alignment is performed. Finally, repair is simplified since the technician need not worry about an exhaustive alignment procedure to get the new component to match an older, aged component. The automatic alignment process of the present application achieves this function.

The disclosed technique of the method and receiver of the present application is fundamentally limited by two things:

a) The speed of the ADCs. Should higher sampling rates be possible, then several of the analog down conversion stages could be accomplished digitally. For example, noting FIG. 3, one could hook the ADC to the quad- hybrid circuit output for example; and b) The speed of the digital computational circuits used to derive $\phi m$ and the video signals. The disclosure in the present application involves that which is achievable today. In the future, it will be possible to sample earlier in the receiver chain. Thus, the present application should not be limited as such.

Alternate variations exist based upon the previous considerations and choices of down conversion techniques as would be recognized by those skilled in the art. The generation of the two vectors (s+jΔ, s–jΔ) also can be varied to any vector format containing the sum and difference signals such as s+jd and –(d+js), for example.

The choice of components (mixers, ADC, filters, etc.) are based upon the choices of down conversion frequencies and the vector format used (s+jΔ, s–jΔ). Any changes in this approach would dictate the use of similar components but arranged in a different manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A digital monopulse radar receiving apparatus, comprising:

first means for generating complex phasor components from radar frequency (RF) sum (Σ) and difference (Δ) signals received by an antenna from an aircraft including, first down conversion means for down converting the received sum and difference RF signals to a first relatively lower intermediate frequency, second down conversion means for down converting the received sum and difference RF signals at the first relatively lower intermediate frequency, to a second relatively lower intermediate frequency to permit conversion to digital form, and analog to digital conversion (ADC) means for sampling the twice down converted sum and difference RF signals to generate digital signals; and second means for determining an azimuth angle, indicating an angle of the detected aircraft in relation to a boresight of the antenna, from the digital signals including, demodulating means for demodulating the digital signals at an intermediate frequency derive from the twice down converted sum RF signal, to generate complex inphase and quadrature components at baseband, and means for generating the azimuth angle from the generated complex inphase and quadrature components.

2. The digital monopulse radar receiving apparatus of claim 1, wherein the first means includes a first channel for generating a first complex phasor Σ+jΔ and a second channel for generating a second complex phasor Σ–jΔ.

3. The digital monopulse radar receiving apparatus of claim 2, wherein each of the first and second channels includes a separate down conversion means and a separate ADC means.

4. The digital monopulse radar receiving apparatus of claim 3, wherein the second means includes a first channel receiving the generated first complex phasor Σ+jΔ from the first channel of the first means and a second channel receiving the generated second complex phasor Σ–jΔ from the second channel of the first means.

5. The digital monopulse radar receiving apparatus of claim 3, wherein the first means further includes another separate second down converting means for down converting the received sum RF signal at the first relatively lower frequency, to the second relatively lower intermediate frequency to permit conversion to digital form, and another separate ADC means for separately sampling the twice down converted sum RF signal to generate digital sum signals, these digital sum signals being used to derive the lower intermediate frequency used by the demodulating means.

6. A digital monopulse radar receiving method, comprising the steps of:

(a) down converting radar frequency (RF) sum ($\Sigma$) and difference ($\Delta$) signals received by an antenna from an aircraft to a first relatively lower intermediate frequency;

(b) down converting the received sum and difference RF signals at the first relatively lower intermediate frequency, to a second relatively lower intermediate frequency to permit conversion to digital form;

(c) sampling the twice down converted sum and difference RF signals to generate digital signals representing complex phasor components of the received sum and difference signals;

(d) demodulating the digital signals at an intermediate frequency derived from the twice down converted sum RF signal, to generate complex inphase and quadrature components at baseband; and (e) generating an azimuth angle, indicating an angle of the detected aircraft in relation to a boresight of the antenna, from the generated complex inphase and quadrature components.

7. The digital monopulse radar receiving method of claim 6, further comprising the steps of:

(f) Splitting the received RF sum ($\Sigma$) signals prior to step (b), one of the split received RF sum ($\Sigma$) signals being subsequently down converted in step (a);

(g) down converting the other of the split RF sum ($\Sigma$) signals at the first relatively lower intermediate frequency, to a second relatively lower intermediate frequency to permit conversion to digital form;

(h) sampling the twice down converted sum ($\Sigma$) RF signals to generate digitally sampled sum signals; and (i) deriving the lower intermediate frequency, prior to step (d) and used for demodulating in step (d), from the generated digitally sampled sum ($\Sigma$) signals.

8. The digital monopulse radar receiving method of claim 6, wherein step (a) includes down converting the received radar sum and difference signals in a first channel and concurrently down converting the received radar sum and difference signals in a second channel, separate from the first channel.

9. The digital monopulse radar receiving method of claim 8, wherein step (c) includes sampling the down converted sum and difference signals in the first channel to generate digital signals representing a first complex phasor $\Sigma+j\Delta$ and concurrently sampling the down converted sum and difference signals in the second channel to generate digital signals representing a second complex phasor $\Sigma-j\Delta$.

10. The digital monopulse radar receiving method of claim 9, wherein step (d) includes demodulating the digital signals representing $\Sigma+j\Delta$ in the first channel to generate first complex inphase (Ia) and quadrature (Qa) components and includes demodulating the digital signals representing $\Sigma-j\Delta$ in the second channel to generate second complex inphase (Ib) and quadrature (Qb) components.

11. The digital monopulse radar receiving method of claim 10, wherein step (e) includes generating the azimuth angle from the first complex inphase (Ia) and quadrature (Qa) components and the second inphase (Ib) and quadrature (Qb) components.

* * * * *